United States Patent

Wildauer et al.

[11] Patent Number: 5,903,555
[45] Date of Patent: May 11, 1999

[54] MODULATION METHOD AND SYSTEM USING CONSTANT ENVELOPE ODSCDMA WITH LOW OUT-OF-BAND EMISSIONS FOR NON-LINEAR AMPLIFICATION

[75] Inventors: Emmanuel M. Wildauer, Los Angeles; Michael J. Pender, Jr., Torrance; John E. Ohlson, Mountain View, all of Calif.

[73] Assignee: TRW Inc., Redondo Beach, Calif.

[21] Appl. No.: 08/739,983

[22] Filed: Oct. 30, 1996

[51] Int. Cl.⁶ .................................................. H04B 7/216
[52] U.S. Cl. .......................................... 370/342; 375/206
[58] Field of Search .................................... 370/316, 317, 370/318, 320, 324, 327, 335, 342, 206, 208, 209; 375/206, 208, 215, 223, 229, 302, 362

[56] References Cited

U.S. PATENT DOCUMENTS 5,491,457   2/1996   Feher ........................................ 375/302
5,514,998   5/1996   Kim ........................................... 375/262
5,696,762   12/1997  Natali et al. .............................. 370/320

OTHER PUBLICATIONS

Dapper and Hill, "SBPSK: A Robust Bandwidth–Efficient Modulation for Hard–Limited Channels"(1984), IEEE, pp. 31.6.1–31.6.6.

*Primary Examiner*—Ajit Patel
*Assistant Examiner*—Chiho Andrew Lee
*Attorney, Agent, or Firm*—Michael S. Yatsko

[57] ABSTRACT

A method and an apparatus are provided for transmission of band limited QPSK data which is orthogonal direct-sequence spread using a BPSK sequence which preserves the band limiting even with subsequent amplification by non-linear amplifiers. This feature allows inexpensive implementation in mass produced, portable communications devices.

30 Claims, 8 Drawing Sheets

MODULATION METHOD AND SYSTEM USING CONSTANT ENVELOPE ODSCDMA WITH LOW OUT-OF-BAND EMISSIONS FOR NON-LINEAR AMPLIFICATION

BACKGROUND OF THE INVENTION

This invention relates generally to telecommunications systems and more particularly to portable wireless telecommunications systems. Satellite systems exist for supporting telecommunications with fixed and mobile user terminals. Satellite based telecommunication systems, such as the Odyssey™ system (as proposed by one of the assignees of the present application), utilize a constellation of satellites to relay communications signals between user terminals and earth or base stations. The user terminals are assigned to earth stations. The earth stations direct calls to and from the assigned user terminals. The user terminals and associated earth stations communicate along preassigned communications channels having a preassigned bandwidth (subband) centered about a carrier frequency.

Technological advances in the last several years to satellite based systems have made it possible to offer voice and data services to hand held terminals on a global basis. The systems can also provide services to fixed installation terminals and basic telephony services in areas lacking terrestrial telecommunications infrastructure. The key objectives for these personal communication satellite services are to offer the services at lower prices to subscribers and to provide a high level of service quality. In order to provide the quality service at a low price, the number of simultaneous subscribers each satellite can support must be maximized while the capital cost of the system (including the cost of terminals) is minimized. The number of subscribers that can be supported depends on the bandwidth available for terminal-satellite communications and satellite-earth station communications, the power required by each terminal, the satellites' RF transmission capability, a variety of physical environment factors, and national/international regulatory constraints (such as terminal radiated power constraints, satellite power flux density constraints and out-of-band emissions constraints.

Several communications systems are in existence, and others have been proposed. One of these systems, the Odyssey™ telecommunications system (proposed by one of the assignees of this application) uses an enhanced continuous phase subclass of orthogonal direct-sequence code division multiple access (ODSCDMA), frequency orthogonality, and frequency re-use techniques to maximize user capacity. Inexpensive and portable battery-operated devices may be used in the Odyssey™ system and are commonly used in other systems. In addition, battery-operated devices must be designed for power efficiency to achieve a reasonable operating time.

One of the most significant factors which limits the operating time of portable wireless communications devices is the power efficiency of the transmitter amplifier. Typical non-linear amplifiers achieve a peak efficiency of approximately 55% in the saturation region versus approximately 20% in the linear region. For this reason, it is highly desirable to operate these amplifiers as close to saturation as possible to take advantage of the nearly 35% increase in efficiency.

As an additional consideration, wireless communications devices must also limit emissions outside the allocated bandwidth to prevent disrupting other services. A standard industry practice for reducing out-of-band (OOB) emissions is to combine Offset Quadrature Phase Shift Keying (OQPSK) with filtering or pulse shaping before amplification. OQPSK techniques are incompatible with the Odyssey™ system because the link is frequency orthogonal and not phase locked. The compromises required for OQPSK techniques are unacceptable, and both filtering and pulse shaping create a time-varying power envelope at the input to the amplifier which is undesirable when used with non-linear amplifiers.

When non-linear amplifiers are operated in saturation, they will significantly distort an input signal with time-varying power. Standard approaches for controlling OOB emissions are ineffective when used with a saturated non-linear amplifier because the amplifier will distort the signal of interest and regrow the out-of-band energy. While it is possible to place the filter after the amplifier, this would result in a significant insertion loss. Maintaining the same RF power level would require increasing amplifier power consumption, further reducing transmitter efficiency and operating time. This option is clearly impractical for battery-powered communications devices.

An example of constant-envelope modulation can be found in "SBPSK: a robust bandwidth efficient modulation for hard-limited channels," Dapper and Hill, IEEE, pages 31.6.1–31.6.6 (1984). A family of constant-envelope modulation formats in which spectral containment is achieved through the use of controlled phase trajectories is described. A BPSK code is used in a non-linear channel, and a linear interpolation is used between one phase state and the next. However, the linear interpolation causes broadening in the spectral domain which degrades frequency orthogonality. Thus, the method described by Dapper & Hill would not be compatible with modulation schemes using frequency orthogonality such as the Odyssey™ system.

Many different methods have been developed for utilizing the available bandwidth. Instead of using the frequency domain of a transponder, it is possible to time-share the entire bandwidth. Time division multiple access (TDMA) provides access to the available transponder spectrum on a time-shared orthogonality basis. In a simple example, one carrier fully occupies the transponder at a time. Each station transmits a burst of digitized voice, video, or data in its exclusively assigned interval. Each user goes in an assigned time slot, one at a time. A drawback of TDMA, however, is that each time slot must be allocated, whether or not it is used. As a result, certain time slots may be empty. TDMA also requires gaps between users, and one user cannot utilize another user's unused time slot to increase the efficiency of the system. Thus, many inefficiencies exist in TDMA systems.

Another method, frequency-division multiple access (FDMA), distributes the users in frequency bands. For example, one user may continuously transmit at a certain frequency and others may transmit at separate frequencies. A similar disadvantage exists in FDMA; a single user may not utilize the other frequencies of other users even if they are not using them. This also leads to inefficiencies. In code division multiple access (CDMA), each transmit station uses a unique pseudorandom code to spread its transmitted signal. Each authorized receiving station in the network must have the identical pseudorandom noise (PN) code for retrieving and collecting the information. Other networks may operate simultaneously within the same spectrum as long as different, non-interfering (orthogonal) codes are used for transmitting and receiving the signals.

Orthogonal, direct sequence CDMA is a variation of standard CDMA. Frequency orthogonality and frequency re-use techniques can also be used.

Orthogonal direct sequence refers to the fact that there is a precomputed code so that a user can be separated out. The code is known by both the handset and by the ground station. The code is necessary to separate the user information out of the data stream.

Direct sequence refers to a system that is not frequency hopping; it is not jumping all over the spectrum from frame to frame. Direct sequence is on a single frequency and a single code. The knowledge of the code is used to separate the information of the user out of the signal. Thus, orthogonal direct sequence refers to knowing the user's code, and that the user is on the same frequency all the time. This is in contrast to frequency hopping spread spectrum where the user is on one frequency, jumps to another frequency, and jumps to a third frequency to avoid something that is interfering with the user's transmission. This frequency hopping is done to avoid the source of the interference since it is most likely not interfering on every frequency.

Frequency orthogonality refers to the fact that subbands are offset at a frequency separation related to the chip rate. The frequency separation can be computed by knowing just the data rate. Thus, the next subband can be displaced by the amount of the frequency separation so that the subbands will not interfere with each other.

Frequency re-use techniques can be described as follows. Beams used in satellite transmissions are so large that they are broken down into cells. Each cell has a set of frequencies associated with it. For example, one set of frequencies can be used for a first cell. However, the same set of frequencies cannot be used for a cell adjacent to the first cell because they would interfere with each other. However, the set of frequencies used in the first cell can be re-used on another cell if it is far enough away from the first cell.

Another CDMA standard, IS95, uses either amplitude shaping or filtering or some combination of the two to vary the power of the signal in amplitude over time. Thus, the chip will be shaped so that when it passes through a filter and passes through a satellite, the data can be separated back out. However, any kind of amplitude change going through a non-linear channel, when the amplifier is heavily compressed generates regrowth from the amplifier which is very undesirable. A great deal of distortion is also created.

Standard industry practices for controlling OOB emissions with a non-linear amplifier significantly degrade system capacity and performance. Therefore, a need exists for a modulation scheme compatible with non-linear amplifiers to permit the manufacture of inexpensive, mass produced, communications devices compatible with the Odyssey™ telecommunications system and others.

BRIEF SUMMARY OF THE INVENTION

The Odyssey™ CDMA system provides a method for continuous phase modulation which allows transmission of QPSK data using orthogonal direct sequence CDMA (ODSCDMA), frequency orthogonality, and frequency re-use techniques, that is compatible with subsequent non-linear amplification.

In theory, a constant power input signal would pass through a non-linear amplifier without distortion. Therefore, it is desirable that the signal to be transmitted have nearly constant power to avoid spectral regrowth. Essentially, the Odyssey™ CDMA system is an enhanced ODSCDMA scheme that achieves compatibility with non-linear amplification by using a constant power envelope. OOB emissions are also reduced by controlling the phase trajectory between QPSK constellation states.

The data used is basically QPSK which, by definition, has in-phase (I) and quadrature (Q) channels or rails. With a QPSK signal, four possible states exist. Multiplying the QPSK signal by a BPSK spreading code is like multiplying the I and Q values by plus or minus one values. Therefore, if the data for the I and Q rails is written independently and multiplied by the same value, both bits invert at exactly the same time.

In a voltage sense, this situation causes the modulator for both of the I and Q rails to go from, for example, plus one volt down to minus one volt, depending on the data bits. However, a problem results from this transition because no real device can transition instantaneously. A finite period of time is required to go from one extreme to another extreme, for example, from plus one volt to minus one volt. This transition, of course, includes a transition through a zero voltage point. As both rails transition through zero volts, at that moment, the power going into the amplifier actually goes to zero. So for a finite period of time, the amplifier has been brought out of saturation down to literally zero input power and then back into saturation. As a result, extremely undesirable out-of-band emissions are generated.

Thus, significant amplifier distortion occurs when the in-phase and quadrature rails simultaneously transition through the origin during $\pi$ radian transitions. As mentioned above, one way to avoid this problem is to use OQPSK, so that only one rail transitions at any time. Unfortunately, ODSCDMA waveforms lose frequency orthogonality when used with an OQPSK modulator. In addition, OQPSK techniques require significant additional complexity to implement a phase-locked demodulator.

The Odyssey™ CDMA system incorporates a mapping function which effects the same result using BPSK spreading codes. First, the in-phase and quadrature data bits are mapped to one of the four possible QPSK constellation states. Then, the binary spreading code and isolation code are added using modulo-2 arithmetic. A "0" result corresponds to no net phase shift, and a "1" result corresponds to a $\pi$ radians phase shift of the QPSK modulator state. Except for symbol boundaries, a transition of 0 radians or $\pi$ radians occurs at each chip boundary. The Odyssey™ CDMA system remaps chip boundary transitions to $\pm\pi/2$ radians transitions to avoid passing through the origin. This is implemented by adding a $+\pi/2$ radians shift to all even-numbered chips. This method works because the in-phase and quadrature rails of the Odyssey™ CDMA system channel are assigned the same BPSK spreading code. This approach eliminates all $\pi$ radians transitions at chip boundaries, leaving only a 25% probability that a $\pi$ radians transition will occur at a symbol boundary.

The present invention provides a method of modulating QPSK data signals, which by definition, have in-phase data bits and quadrature data bits. The modulation method uses CDMA modulation techniques and is compatible with non-linear amplification. The method comprises several steps. For example, the in-phase data bits and the quadrature data bits are mapped to one of four QPSK constellation states. A BPSK isolation code is generated by truncating a pseudo-random noise code sequence. A plurality of BPSK CDMA spreading codes are provided, and one is selected. The selected BPSK CDMA spreading code is combined with the BPSK isolation code using modulo-2 addition to produce a spreading code. The spreading code is added to the in-phase data bits and the quadrature data bits using modulo-2 addition to produce CDMA encoded spread data. A $\pi/2$ radians rotation is added to even-numbered chips of the CDMA encoded spread data to remap the transitions of the CDMA encoded spread data. In addition, the transitions are mapped to the unit circle to produce a constant power signal. The constant power signal is then filtered using mild anti-aliasing filtering. Finally, the filtered constant power signal is passed through a non-linear amplifier to produce a constant power RF output. In the preferred embodiment of the invention, a sinusoidal interpolation is performed to map the transitions to the unit circle.

An apparatus is also provided for modulating QPSK data signals using CDMA modulation techniques, as well as being compatible with non-linear amplification. The method and apparatus are described further below.

DETAILED DESCRIPTION OF THE INVENTION

FIGS. 1a–1d illustrate symbol and chip boundary transition paths for conventional ODSCDMA and the Odyssey™ CDMA system. Although the present invention is described in terms of a preferred embodiment in which the Odyssey™ system is detailed, the inventors envision, as would those having ordinary skill in the art, the numerous other applications of this invention to communication systems, as well as any system having non-linear amplification requirements. The QPSK signals can, of course, be written as an amplitude and a phase. In the Odyssey™ CDMA system, the signals are converted to be constant amplitude. The signal would thus have one phase on one chip and another phase on the next chip.

Figure 1A:
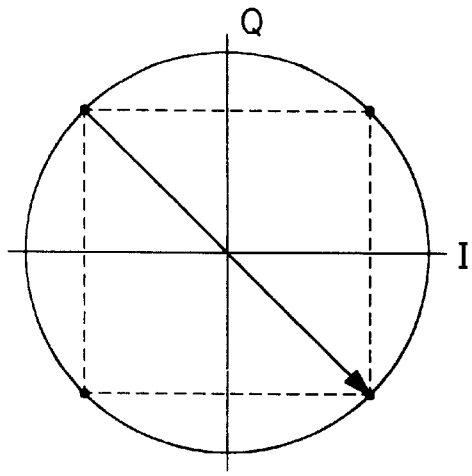
FIGS. 1a–1d are schematic representations of symbol and chip boundary transition paths for a conventional ODSCDMA method and for the continuous-phase constant-envelope modulation method of the invention.

In particular, FIG. 1a illustrates that at chip boundary transitions in standard ODSCDMA there is a 50% probability the modulator will not transition, and a 50% probability the modulator will transition by $\pi$ radians. This transition probability is indicated by the arrow shown in FIG. 1a. It is apparent that one transition through the origin per two chips results. This transition through the origin is very undesirable as explained above.

Figure 1B:
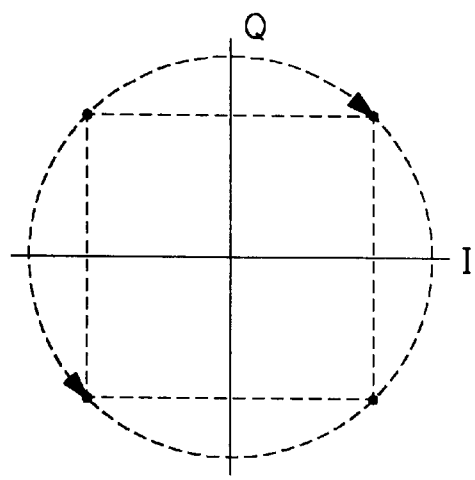

By contrast, in the Odyssey™ CDMA system, the modulator always transitions by $\pm\pi/2$ radians at a chip boundary. This 100% probability of a $\pm\pi/2$ radians shift is illustrated in FIG. 1b. An advantage of the Odyssey™ CDMA system is that no transitions pass through the origin on chip boundary transitions. The consistent nature of the Odyssey™ CDMA system chip boundary transitions produces a very predictable power spectral density and low OOB emissions, and enables excellent Multiple Access Interference (MAI) rejection. The method and apparatus for carrying out these beneficial features of the invention are described further below.

Figure 1C:
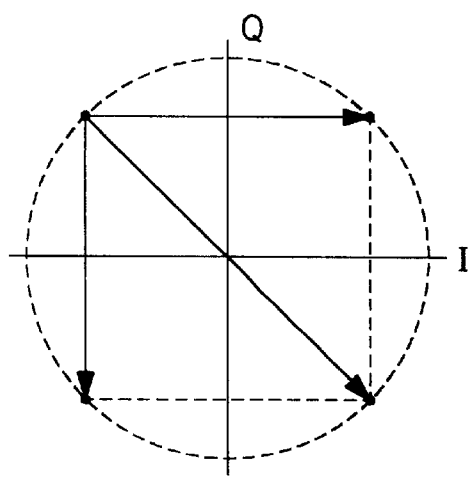

FIG. 1c illustrates conventional symbol boundary transitions. As shown, the symbol boundary transitions in conventional ODSCDMA have a 25% probability of zero radian shift, a 50% probability of $\pi/2$ radian shift, and a 25% probably of $\pi$ radian shift. Also, one transition through the origin results per four symbols.

Figure 1D:
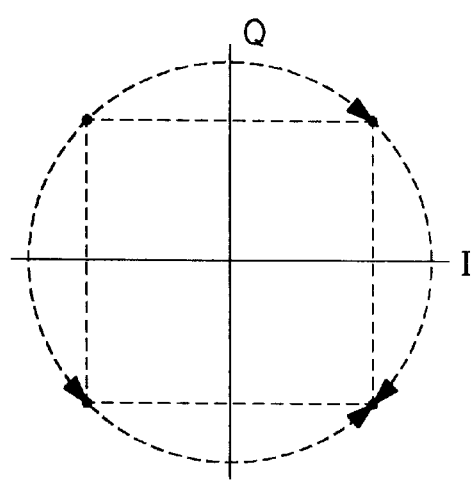

The Odyssey™ CDMA system symbol boundary transitions are illustrated in FIG. 1d. As shown, the symbol boundary transitions have a 25% probability of zero radian shift, a 50% probability of $\pi/2$ radian shift and a 25% probability of $\pi$ radian shift. Thus, the probabilities are the same as in conventional ODSCDMA. However, there are no transitions through the origin on symbol boundary transitions in the Odyssey™ CDMA system. In addition, one $\pi$ radian transition per 320 chips results. The transition diagrams of FIGS. 1a–1d are explained further below.

Figure 2:
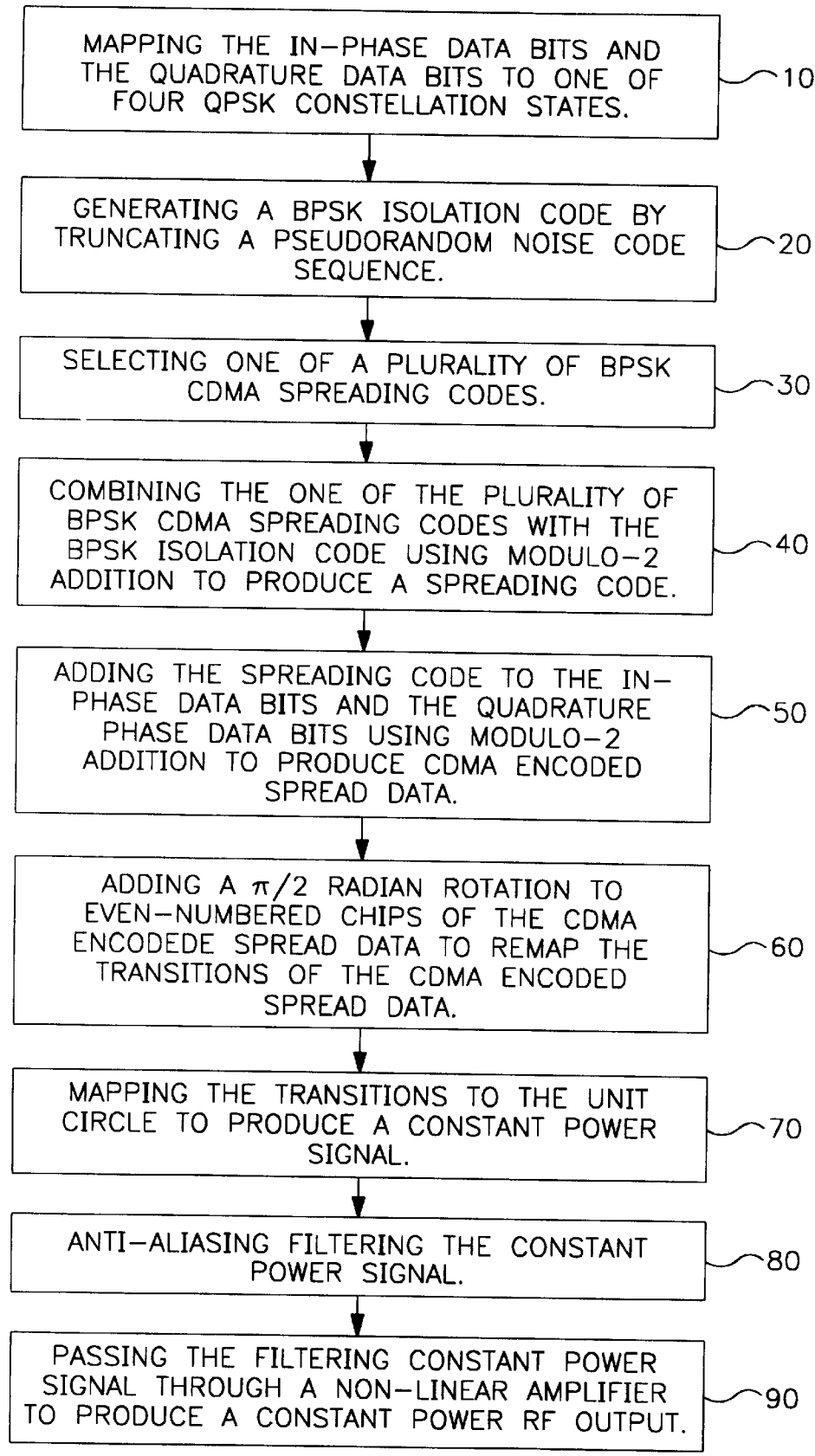
FIG. 2 is a flowchart illustrating the method steps for a continuous-phase constant-envelope modulation system of the invention which allows transmission of QPSK data using ODSCDMA, frequency orthogonality and frequency re-use techniques, and is compatible with subsequent non-linear amplification.

A preferred embodiment of the present invention provides a method of modulating QPSK data signals. By definition, the QPSK data signals have in-phase data bits and quadrature data bits. The method uses CDMA modulation techniques and is compatible with non-linear amplification. A preferred embodiment of the method is illustrated in FIG. 2. FIG. 2 is a flowchart illustrating the steps of the method for a continuous-phase constant-envelope modulation system of the invention which allows transmission of QPSK data using ODSCDMA, frequency orthogonality and frequency re-use techniques. The method is compatible with subsequent non-linear amplification.

The method set forth in FIG. 2 provides, in step 10, mapping the in-phase data bits and the quadrature data bits to one of four QPSK constellation states. Such typical QPSK constellation states are illustrated in FIGS. 1a–1d. In step 20 of the method, a BPSK isolation code is generated by truncating a pseudorandom noise code sequence. Step 30 of the method provides a step of selecting one of a plurality of BPSK CDMA spreading codes. As illustrated in step 40 of the method, the selected one of the plurality of BPSK CDMA spreading codes is combined with the BPSK isolation code using modulo-2 addition to produce a spreading code. In addition, step 50 provides a step of adding the spreading code to the in-phase data bits and quadrature data bits using modulo-2 addition to produce CDMA encoded spread data. A $\pi/2$ radian rotation is added to even-numbered chips of the CDMA encoded spread data as set forth in step 60. This is done to remap the transitions of the CDMA encoded spread data. Step 70 of the method sets forth the step of mapping the transitions to the unit circle to produce a constant power signal. Step 80 provides the step of providing anti-aliasing filtering of the constant power signal. This is basically done, as would be apparent to one skilled in the art, to clean up harmonics generated from digital to analog conversion. Finally, in step 90, the filtered constant power signal is passed through a non-linear amplifier to produce a constant power RF output.

In a further preferred embodiment, the mapping of the transitions to the unit circle to produce a constant power signal as set forth in step 70 can further comprise the step of performing a sinusoidal interpolation on the transition to map the transitions to the unit circle. Alternatively, other interpolation schemes may be performed. However, the sinusoidal interpolation is preferred.

Also, in step 30, selecting a BPSK CDMA spreading code from a plurality of spreading codes can be performed in many ways. A CDMA spreading code may be generated or may be selected from a plurality of spreading codes which may be stored in a code book. For example, in the Odyssey™ system, an 80-code book is used.

Figure 3:
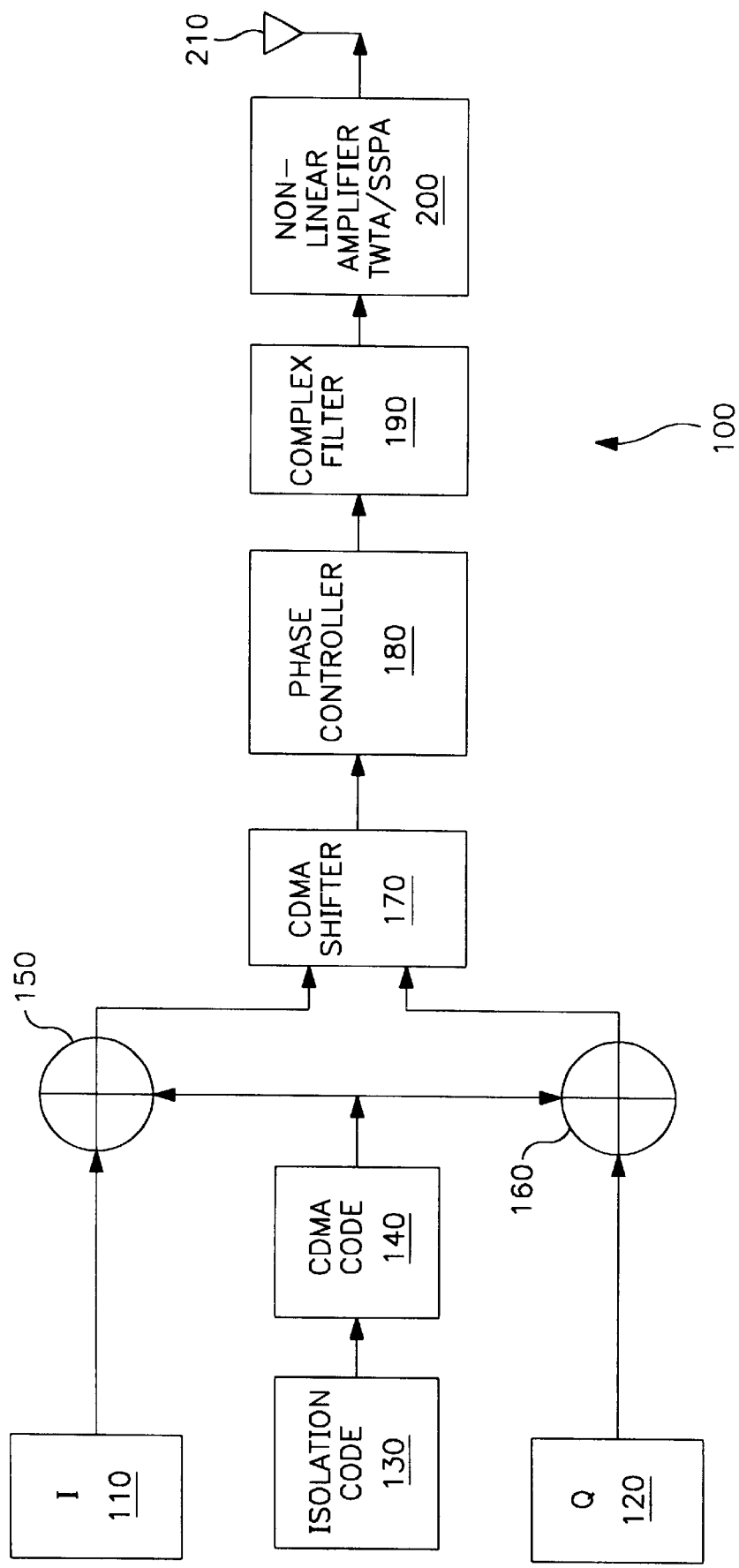
FIG. 3 is a block diagram illustrating a preferred embodiment of a continuous-phase constant-envelope modulation system of the present invention.

FIG. 3 illustrates a block diagram of a preferred embodiment of the apparatus of the present invention which is capable of performing and operating in conformance with the steps of the method set forth above. A preferred embodiment of a Odyssey™ CDMA modulation system 100 is illustrated generally in FIG. 3. The system 100 includes, since QPSK data is used, an in-phase (I) rail 110 and a quadrature rail 120. An isolation code generator 130 is illustrated in FIG. 3 and provides an output of an isolation code to a CDMA code unit 140. The CDMA code unit 140 may select a CDMA spreading code from a code book for example. Alternatively, a CDMA code may be generated. The selected or generated CDMA spreading code is combined with the BPSK isolation code from the isolation code generator 130 using modulo-2 addition to produce a spreading code. The spreading code is then added to the I rail 110 in a modulo-2 adder 150. Similarly, the spreading code from the CDMA code unit 140 is combined with the data bits from the Q rail 120 in another modulo-2 adder 160. The outputs of the modulo-2 adders 150, 160 are in-phase and quadrature CDMA encoded spread data. This CDMA spread code is fed into a CDMA shifter 170. The CDMA shifter 170 adds a $\pi/2$ radian rotation to even-numbered chips of the CDMA encoded spread data to remap the transitions of the CDMA encoded spread data. A phase controller 180 is provided to map the transitions to the unit circle to produce a constant power signal. The phase controller 180 also controls the direction of rotation on the unit circle. In a preferred embodiment, a sinusoidal interpolation is performed in the phase controller 180. Alternatively, other interpolation schemes may be performed.

The constant power signal is then fed to a complex filter 190. The complex filter 190 provides mild anti-aliasing filtering to the constant power signal. This is done to correct the effects of the digital to analog conversions and the harmonics generated thereby. The filtered constant power signal is then transmitted to a non-linear amplifier 200 which may be a traveling wave tube or solid state power amplifier. A constant power RF output is provided at the output of the non-linear amplifier 200 and can be directed to an antenna 210.

Once the data, spreading code and isolation code are combined and mapped to a $\pm\pi/2$ radians transition, the initial and final QPSK constellation states of the transition have been determined. The Odyssey™ CDMA system also defines the length, rotation direction, and transition function of the phase trajectory. Because of the $\pm\pi/2$ mapping, the path length at chip boundary transitions is $\pi/2$ radians in one direction of rotation and $3\pi/2$ radians in the other direction.

The Odyssey™ CDMA system always traverses the shorter path on chip boundary or symbol boundary transitions.

Since the modulator now moves along a phase trajectory half as long as before, a much greater proportion of the transmitted energy is contained in the side lobes nearest the carrier frequency. In addition, the combination of $\pm\pi/2$ mapping and continuous phase modulation elongates the CDMA chips in the time domain. This causes narrowing of spectral side lobes in the frequency domain, as compared to standard ODSCDMA side lobes. This effect reduces the shaping factor required to meet a standard spectral emissions mask. Since MAI is primarily a function of the fraction of the CDMA chip that is shaped, this effect significantly reduces degradation due to MAI.

The Odyssey™ CDMA system standard also defines modulator behavior at symbol boundary transitions. Standard ODSCDMA produces spectral lines at harmonics of the chip frequency which interfere with communications systems that share the same or adjacent frequency bands. Spectral lines occur in the nulls between spectral side lobes when the $\pm\pi$ radians chip boundary and symbol boundary transitions are not balanced. The Odyssey™ CDMA system uses the $\pm\pi/2$ mapping function to eliminate $\pm\pi$ radians chip boundary transitions and includes logic to balance symbol-to-symbol transitions. The Odyssey™ CDMA system counts $\pm\pi$ radians transitions at the symbol boundaries and changes the direction of rotation upon completing full cycles. Optimum performance results when the modulator performs two rotations in the same direction, completing one full cycle, and then reverses direction.

Another significant difference between conventional ODSCDMA and the Odyssey™ CDMA system is the control of the phase trajectory between QPSK constellation states to further reduce OOB emissions. The path between two successive complex values sent to a digital phase shifter running at a finite sampling rate can be modeled as a chord connecting two points on the unit circle. The distance from the center of the chord to the circle represents the instantaneous power variation at the input to the amplifier.

In conventional ODSCDMA, a $\pm\pi$ radians transition forces a non-linear amplifier to completely exit and return to saturation as the modulated signal passes through the origin. This produces significant distortion and loss of amplifier efficiency. The Odyssey™ CDMA system forces the transition to occur on the unit circle, creating a constant power signal at the input to the non-linear amplifier. With the Odyssey™ CDMA system, the chords never deviate far from the unit circle, producing much less power variation than standard ODSCDMA and nearly eliminating non-linear amplifier distortion and spectral regrowth.

As discussed by Dapper and Hill, for example, for a transition from $\pi/2$ to $3\pi/2$, intermediate points that are an equal distance apart would be used. The number of intermediate states would be added for each incremental state as one goes through the transition. When this situation is drawn, an initial phase and a final phase are connected by a straight line. Thus, at the ends of this straight line, the first and second derivatives of the phase transition are discontinuous. This discontinuity produces an increase in the spectral side lobes. The increase in the spectral side lobes also results in a degradation of frequency orthogonality. A second problem that results is regrowth humps in the power spectral density which are created at a greater distance out from the subband center.

To combat the inadequacies of Dapper and Hill's scheme, the present modulation scheme utilizes sinusoidal interpolation. The sinusoidal equation is set forth and discussed below. In short, this sinusoidal interpolation embodies a "lazy S" curve from the beginning to the end of the transition, instead of a straight line. The sinusoid corrects for the discontinuities in the first and second derivatives at the ends of the linear interpolation. Thus, the first and second derivatives of the sinusoidal interpolation are continuous, and the side lobes are exactly as those found in regular QPSK. As a result, the spectrum is very clean.

As described above, it is important to avoid transitioning through the origin to avoid causing the amplifier to generate extreme OOB emissions. To this end, digital direct frequency synthesis (DDFS) can be used. The values are input to the DDFS as well as different phase states, along with a carrier so that the DDFS performs phase rotations on the unit circle to avoid passing through the origin. FIG. 1d illustrates this advantage. As an added advantage, the DDFS is extremely cheap to mass produce which lowers the cost of the overall system in which it is used.

Continuous phase modulation refers to a modulation technique in which the power of the envelope is held constant. The phase of the signal is varied directly.

The Odyssey™ CDMA modulation system is defined for a single channel signal (S(t)) at IF or RF as follows:

$$S(t) = \left(\frac{A}{\sqrt{2}}\right)\sqrt{(I^2(t) + Q^2(t))} \cos(\omega t + \phi(t) + \theta)$$

where A is the signal amplitude, $\omega$ is the subband carrier frequency in radians/sec, t is time, I(t) is the in-phase modulation, Q(t) is the quadrature modulation, $\phi(t)$ is the information-bearing carrier phase defined by $$\phi(t) = \arctan(-Q(t)/I(t))$$

(defined from $-\pi$ to $+\pi$ radians based on signs of Q(t) and I(t)
and q is an arbitrary fixed phase. Because the Odyssey™ CDMA system is constant-envelope, $$\sqrt{(I^2(t) + Q^2(t))} = 1$$

There are up to 80 independent channel signals arriving at the Odyssey™ system Earth Station in each subband, with each signal having somewhat different power, frequency, phase and timing. The power, frequency and chip timing are controlled via loop signaling to be nearly the same as received by the satellite, but received phase is independent from signal to signal. The in-phase and quadrature modulation are generated from the multiplexed encoded voice or data plus signaling as described below.

To produce a more noise-like waveform, the sequence of orthogonal codewords are combined with an isolation code using modulo-2 addition prior to using the chip sequence to spread a user's code symbols. As with the orthogonal spreading sequence, the same code is applied to the in-phase and quadrature-phase code symbols, which is equivalent to BPSK spreading. The same isolation code is used by all CDMA channels in the Odyssey™ system.

Figure 4:
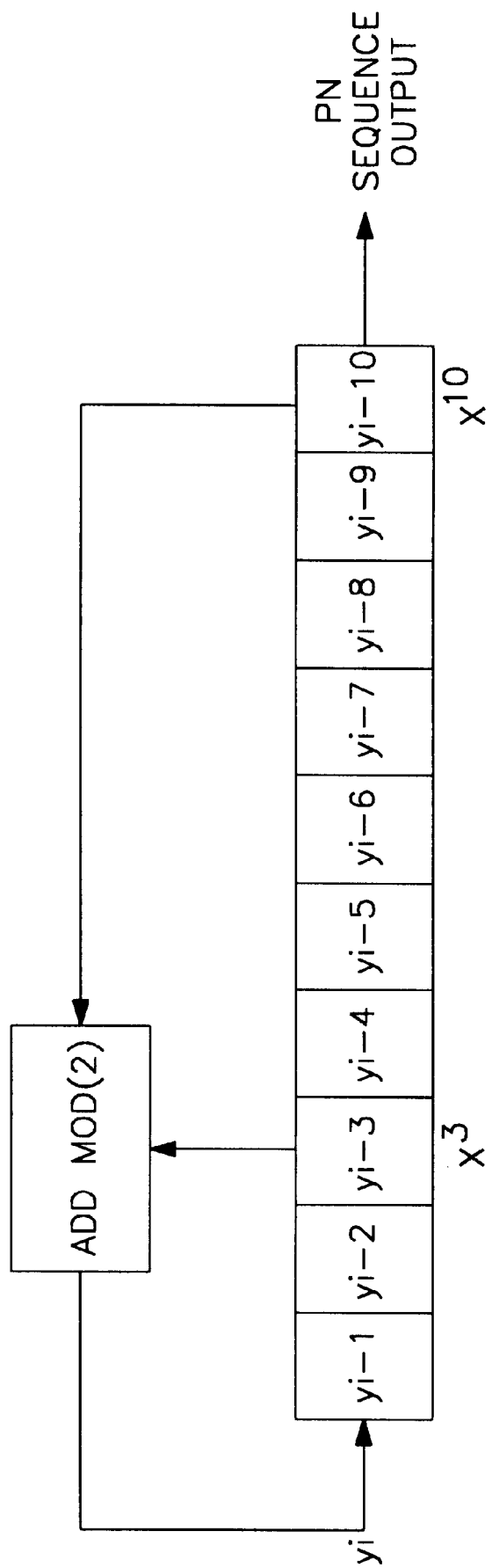
FIG. 4 is a block diagram illustrating how a preferred embodiment of a PN code is generated in the present invention.

The preferred embodiment uses Quadratic Residue spreading codes and an isolation code generated by truncating eight repetitions of a 1,023-chip PN sequence. The PN sequence is characterized by the primitive polynomial $X^{10}+X^3+1$ and is generated as shown in FIG. 4. This corresponds to the recursion $y_i = y_{i-3} \oplus y_{i-10}$ where $\oplus$ indicates modulo-2 addition. The shift register is initialized with the first 10 chip values: $y_1$ through $y_{10}$ set to (1001001001) respectively. This corresponds to i=11. The recursion is then used to generate $y_{11}$ through $y_{7680}$.

Each frame of baseband modulating data consists of a sequence of 5,440 in-phase chips and 5,440 quadrature chips. The sequence of in-phase chips are denoted $c_1 \ldots c_{5440}$, where $c_1$ is the first chip in the frame and $c_{5440}$ is the last chip in the frame. The sequence of quadrature chips are denoted $d_1 \ldots d_{5440}$. For conventional ODSCDMA, the baseband modulation $I_q(t)$ and $Q_q(t)$ for a single frame (where t=0 is the starting time of the frame) are given by:

$$I_q(t) = \sum_{n=1}^{5440} (2c_n - 1)[u(t/T_c - n + 1) - u(t/T_c - n)]$$

$$Q_q(t) = \sum_{n=1}^{5440} (2d_n - 1)[u(t/T_c - n + 1) - u(t/T_c - n)]$$

where u(t)=1 if t≥0; 0 if t<0

$T_c$=chip duration: (1/272) msec

The expression $(2c_n-1)$ converts the chips from the digital (0,1) values to the (-1,+1) values appropriate for describing the modulation. The corresponding conventional ODSCDMA carrier phase is given by:

$$\Phi_q(t) = \arctan(-Q_q(t)/I_q(t))$$

Because the spreading modulation is effectively BPSK, all chip transitions with conventional ODSCDMA have a 50% probability each of being are either 0 or $\pi$ radians in phase within a given code symbol. Chip transitions on code symbol boundaries have a 25% probability each of being 0, $+\pi/2, -\pi/2$, or $\pi$ radians.

A distinct difference between conventional ODSCDMA and the Odyssey™ CDMA system is a $+\pi/2$ radian phase shift added to all even-numbered chips. This causes 100% of the chip transitions within a code symbol to be either $+\pi/2$ or $-\pi/2$ radians. Transitions on code symbol boundaries remain equally likely to be 0, $+\pi/2, -\pi/2$, or $\pi$ radians. This is stated mathematically by introducing the phase $\Phi_n$ defined as follows:

$$\Phi_n = \arctan[-(2d_n - 1)/(2c_n - 1)] \quad \text{for } n \text{ odd}$$

$$= \arctan[-(2d_n - 1)/(2c_n - 1)] + \pi/2 \quad \text{for } n \text{ even}$$

$\Phi_n$ is considered to take on values of $\pm\pi/4$ and $\pm 3\pi/4$, with the quadrant determined by the signs of $(2d_n-1)$ and $(2c_n-1)$. An exception to this occurs for phase transitions which cross the minus y axis (or $+/-\pi$ phase). When calculating the phase during such transitions, negative values of $\Phi_n$ have $2\pi$ added to them.

The preferred embodiment uses continuous-phase transitions having a sinusoidal phase trajectory. With time sampled in increments of $T_c/32$, the time $t_{n,i}$ relative to the start of the frame is defined by $$t_{n,i} = [n-1+(2i-1)/64]T_c$$

where n=1, ..., 5440 and i=1, ..., 32. The information-bearing phase $\Phi(t)$ at time $t_{n,i}$ is given by $$\Phi(t_{n,i}) = a(i)\Phi_{n-1} + b(i)\Phi_n + c(i)\Phi_{n+1}$$

The coefficients a(i), b(i), and c(i) are given in Table 1 for Class 1 (typical) and Table 2 for Class 2 (narrowband)

modulation. Class 2 modulation is used on a selectable basis for subbands near the edges of the assigned band to reduce OOB interference.

Ideally, CDMA chips basically have a rectangular shape. However, since they are shaped, the corners are slightly rounded. The amount of interference generated by having a number of users on the same subband is a function of how much the corners are rounded off. In order to reduce the out-of-band emissions, it is necessary to round off the corners to a greater extent on the users at the edge of the subband to avoid interference with adjacent communication systems, for example, Iridium.

The subbands in the middle of the allocated space do not need as much shaping since they will have less chance of interfering with adjacent systems in the frequency spectrum. For example, 38 subbands exist in the Odyssey™ system. Subbands 1 and 38, for example, require a higher degree of shaping to avoid interference with the adjacent subbands. This is done to reduce the amount of out-of-band emissions, but provides slightly higher self-interference. However, the subbands in the middle of the 38 subbands are unlikely to interfere with any other users, and therefore, do not require as much shaping. Class 1 and Class 2 shape a different amount of the chip, although they use the same modulation scheme. For example, in Class 2 modulation, 12.5% of the chip is shaped at either end, whereas in Class 1, for example, 18.75% of this chip is shaped at either end.

The appropriate multiple of $2\pi$ is added to $\Phi_{n-1}$, $\Phi_n$, or $\Phi_{n+1}$, if necessary, to ensure the transition does not exceed $\pi$ radians (i.e., to avoid a $\pi/2$ transition from being misinterpreted as a $3\pi/2$ transition in the calculation). For transitions of $\pi$ radians (which occur only on code symbol boundaries and then only with 25% probability), the appropriate multiple of $2\pi$ is added to $\Phi_{n-1}$, $\Phi_n$, or $\Phi_{n+1}$, if necessary, so that two consecutive clockwise $\pi$ radians transitions are followed by two consecutive counter-clockwise $\pi$ radians transitions. Balancing $+\pi$ and $-\pi$ transitions prevents creating discrete line spectra in the transmitted waveform.

TABLE 1

| Index (i) | a(i) | b(i) | c(i) |
|---|---|---|---|
| 1 | 0.413175911 | 0.586824089 | 0.000000000 |
| 2 | 0.250000000 | 0.750000000 | 0.000000000 |
| 3 | 0.116977778 | 0.883022222 | 0.000000000 |
| 4 | 0.030153690 | 0.969846310 | 0.000000000 |
| 5 to 28 | 0.000000000 | 1.000000000 | 0.000000000 |
| 29 | 0.000000000 | 0.969846310 | 0.030153690 |
| 30 | 0.000000000 | 0.883022222 | 0.116977778 |
| 31 | 0.000000000 | 0.750000000 | 0.250000000 |
| 32 | 0.000000000 | 0.586824089 | 0.413175911 |

The last phase value ($\Phi_{5440}$) in the preceding frame is used as $\Phi_o$ when calculating the phase trajectory on the initial transition. If the preceding frame is inactive, $\Phi_o$ is equal to $\Phi_1$ of the current frame. Similarly, $\Phi_{5441}$ is $\Phi_o$ of the subsequent frame. Because the sync field is active throughout the call, $\Phi_o$ is always an active phase.

TABLE 2

| Index (i) | a(i) | b(i) | c(i) |
|---|---|---|---|
| 1 | 0.439731660 | 0.560268340 | 0.000000000 |
| 2 | 0.322697556 | 0.677302444 | 0.000000000 |
| 3 | 0.215967627 | 0.784032373 | 0.000000000 |
| 4 | 0.125744626 | 0.874255374 | 0.000000000 |
| 5 | 0.057271987 | 0.942728013 | 0.000000000 |
| 6 | 0.014529091 | 0.985470909 | 0.000000000 |
| 7–26 | 0.000000000 | 1.000000000 | 0.000000000 |
| 27 | 0.000000000 | 0.985470909 | 0.014529091 |
| 28 | 0.000000000 | 0.942728013 | 0.057271987 |
| 29 | 0.000000000 | 0.874255374 | 0.125744626 |
| 30 | 0.000000000 | 0.784032373 | 0.215967627 |
| 31 | 0.000000000 | 0.677302444 | 0.322697556 |
| 32 | 0.000000000 | 0.560268340 | 0.439731660 |

Figure 8:
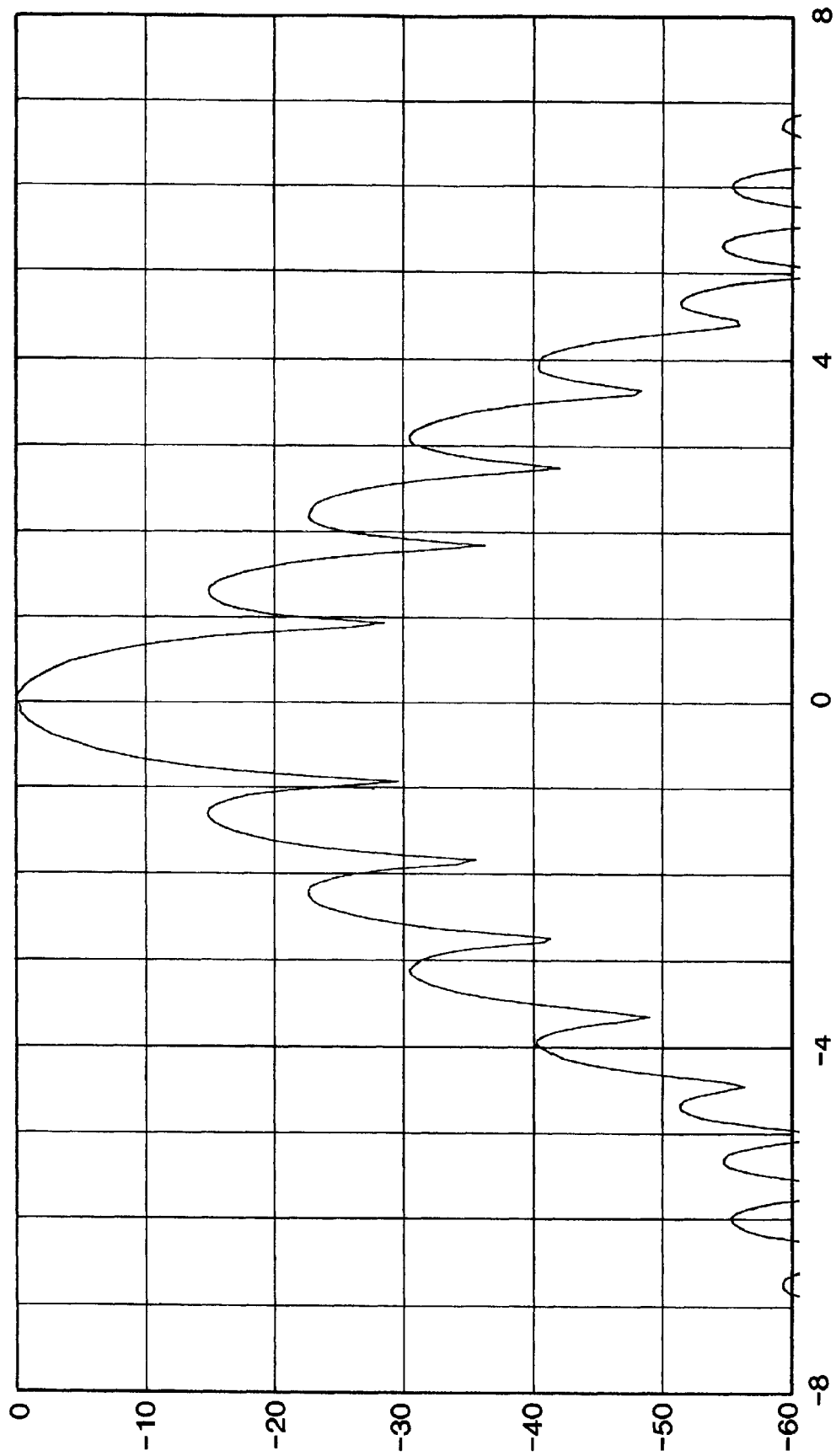
FIG. 8 is a waveform diagram illustrating the PSD of a QPSK signal generated with 37.5% sinusoidal chip shaping and $\pm\pi/2$ shifting passed through an anti-aliasing filter and a non-linear amplifier at 2 dB compression.

Thus, a main advantage of the modulation scheme described above is that it is a constant power signal so that it can be passed through a non-linear amplifier with virtually no change. No degradation is experienced as illustrated in FIG. 8 described below. This creates a huge improvement in efficiency of over 30% (from 20% to 55% as discussed above). This also allows battery-operated devices such as cellular phones to run much longer on a single power source due to the more efficient operation. Also, non-linear amplifiers are very inexpensive which is an incentive to use them in portable cellular devices to reduce costs.

FIGS. 5–8 graphically illustrate resulting waveforms when the apparatus and method of this invention are utilized. A description of each follows.

Figure 5:
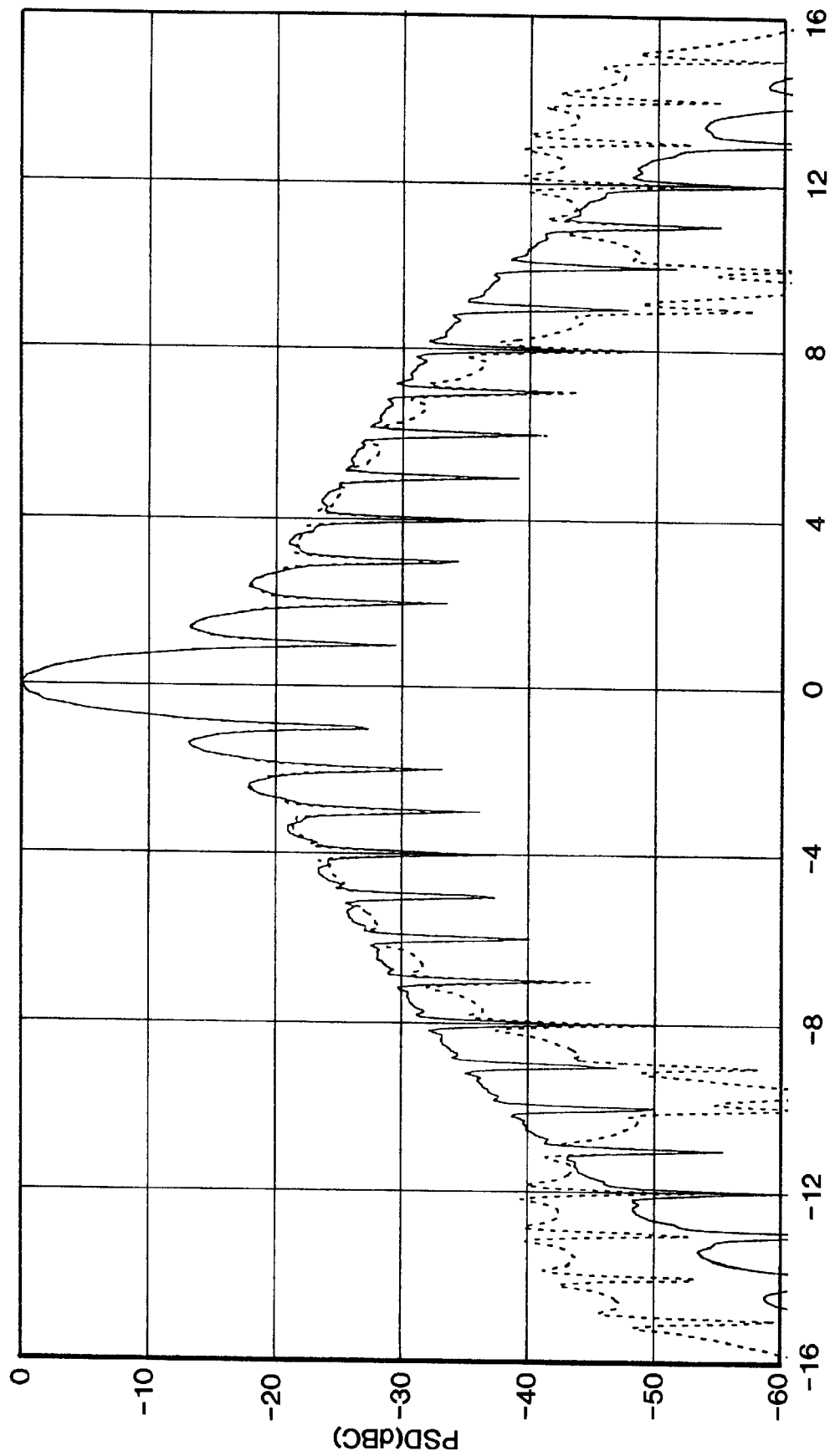
FIG. 5 is a waveform diagram illustrating the power spectral density (PSD) resulting from 12.5% sinusoidal chip shaping and the PSD resulting from 12.5% linear chip shaping.

FIG. 5 illustrates the power spectral density (PSD) resulting from 12.5% sinusoidal chip shaping. The dotted line represents 12.5% linear chip shaping. FIG. 5 illustrates that the spectral humps that occur due to the discontinuity of the second derivative of the interpolation function result in trading attenuation on side lobes 4 to 11 for higher emissions on side lobes 12 to 16. The PSD obtained by sinusoidal interpolation does not roll off as quickly, but no spectral humps occur. Other PSD solutions would result for other shaping interpolation functions.

Figure 6:
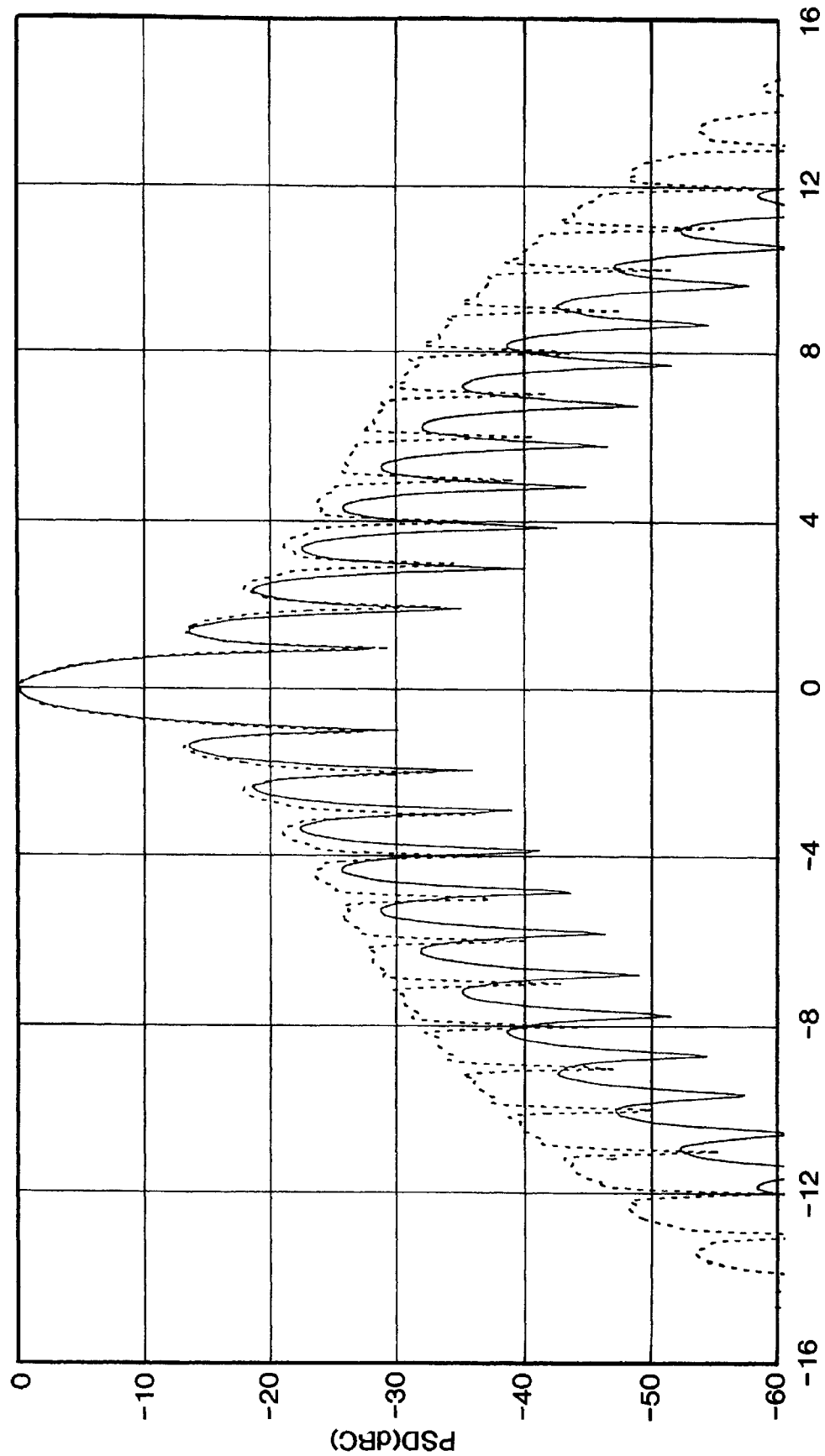
FIG. 6 is a waveform diagram illustrating the PSD that results when $\pm\pi/2$ shifting is added to a 12.5% sinusoidally shaped signal.

FIG. 6 illustrates the PSD that results when $\pm\pi/2$ shifting is added to a 12.5% sinusoidal shaped signal. The dotted line shows the PSD that results without $\pm\pi/2$ shifts. Before the addition of the $\pm\pi/2$ shifts, the PSD had flat spectral side lobes. These flat side lobes result from the direction logic that controls the number of successive rotations in one direction. With $\pm\pi/2$ shifting, the side lobes became rounded, and the spectral side lobes became narrower. However, for small shaping factors the first few sidelobes are almost identical to QPSK.

Figure 7:
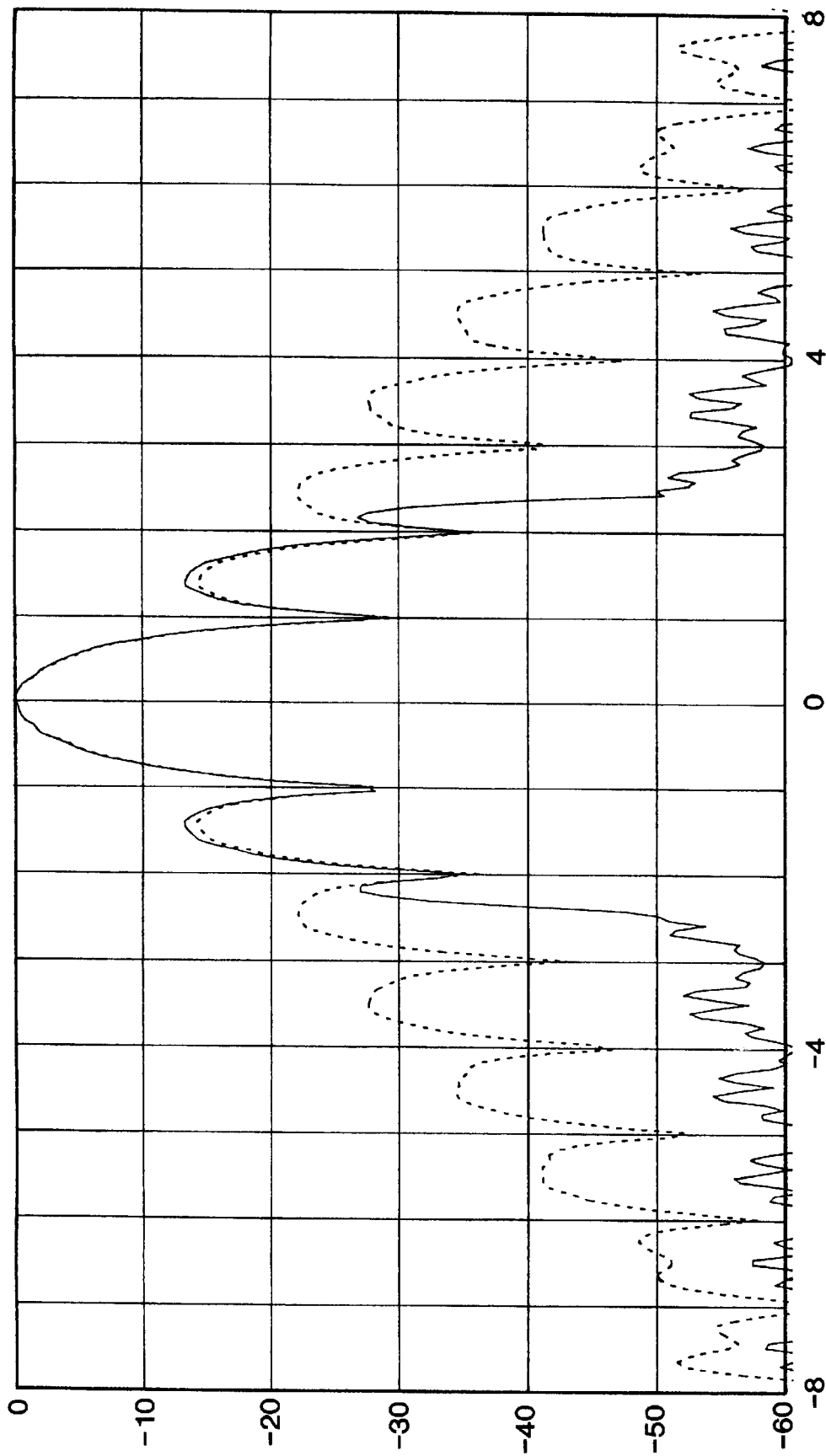
FIG. 7 is a waveform diagram illustrating the PSD of a filtered QPSK signal before and after passing through a non-linear amplifier at 2 dB compression.

FIG. 7 illustrates the non-linear amplifier effects on a filtered QPSK signal. The PSD of the filtered QPSK signal is illustrated before and after passing through a non-linear amplifier at 2 dB compression. The solid line of FIG. 7 illustrates the signal at the input of the amplifier. The line represents a standard QPSK signal passed through an equiripple low-pass filter to provide 30 dB of attenuation. The dashed line shows the spectrum with regrowth and distortion due to the non-linear effects of the amplifier.

FIG. 8 illustrates the amplifier effects on a shaped QPSK signal. As illustrated, the PSD of a QPSK signal generated with 37.5% sinusoidal chip shaping and $\pm\pi/2$ radians shifting pass through an anti-aliasing filter and the non-linear amplifier at 2 dB compression is shown. The solid line is a signal before the amplifier and the dotted line is a signal after the amplifier. The two lines fall directly on top of each other. No spectral regrowth or distortion is apparent. The nearly constant power envelope along with the sinusoidal chip shaping and the $\pm\pi/2$ shifting, as well as mild anti-aliasing filtering, provide an excellent replica of the input signal at the output of the non-linear amplifier.

While particular elements, embodiments and applications of the present invention have been shown and described, it will be understood, of course, that the invention is not limited thereto since modifications may be made by those skilled in the art, particularly in light of the foregoing teachings. It is, therefore, contemplated by the appended claims to cover such modifications and incorporate those features which come within the spirit and scope of the invention.

We claim:

1. A method of modulating QPSK data signals having in-phase data bits and quadrature data bits using CDMA modulation techniques, the method comprising the steps of:

mapping in-phase data bits and the quadrature data bits representing QPSK data to QPSK constellation states;

combining the in-phase data bits and the quadrature data bits with a pseudorandom orthogonal spreading code to produce chips representing CDMA encoded spread data; and mapping modulator transitions of alternating chips to QPSK constellation states in accordance with an angular offset preventing transitions through a modulator state origin, thereby producing a modulated signal.

2. The method according to claim 1 further comprising the step of:

filtering the modulated signal.

3. The method according to claim 2 wherein the step of filtering the modulated signal further comprises performing anti-aliasing filtering.

4. The method according to claim 1 wherein the step of mapping modulator transitions further comprises the step of performing a linear interpolation on the transitions.

5. The method according to claim 1 wherein the step of mapping modulator transitions further comprises the step of performing a sinusoidal interpolation on the transitions.

6. The method according to claim 1 wherein the step of mapping modulator transitions further comprises the step of controlling direction of rotation and distance of the mapping of the transitions.

7. The method according to claim 6 wherein the step of controlling direction of rotation and distance of the mapping of the transitions further comprises:

performing two rotations in a same direction thereby completing one full cycle, and then reversing direction.

8. The method according to claim 6 further comprising:

performing ±π radians transitions at symbol boundaries and changing direction of rotation upon completing a full cycle.

9. The method according to claim 1 further comprising the step of:

shaping the phase transition of the modulated signal.

10. The method according to claim 9 wherein the step of shaping the phase transition is performed to a greater extent to subbands near an edge of the assigned band.

11. The method according to claim 1 wherein the step of combining further comprises the steps of:

generating a BPSK isolation code;

selecting a CMDA spreading code;

adding the CMDA spreading code to the BPSK isolation code using modulo-2 addition to produce the pseudo random orthogonal spreading code.

12. The method according to claim 11 wherein the step of selecting a CDMA spreading code further comprises selecting a spreading code from a code book.

13. The method according to claim 11 further comprising the step of:

generating a CDMA spreading code.

14. The method according to claim 11 wherein the step of generating a BPSK isolation code further comprises truncating a pseudorandom noise code sequence.

15. The method according to claim 11 wherein the step of mapping modulator transitions further comprises the step of performing a sinusoidal interpolation on the transitions.

16. The method according to claim 11 wherein the step of mapping modulator transitions further comprises the step of controlling direction of rotation and distance of the mapping of the transitions.

17. The method according to claim 16 wherein the step of controlling direction of rotation and distance of the mapping of the transitions further comprises:

performing two rotations in the same direction thereby completing one full cycle, and then reversing direction.

18. The method according to claim 16 further comprising:

performing ±π radians transitions at symbol boundaries and changing the direction of rotation upon completing a full cycle.

19. An apparatus for modulating QPSK data signals having in-phase data bits and quadrature data bits using CDMA modulation techniques, the apparatus comprising:

an isolation code generator having an output;

a CDMA code selector connected to the output of the isolation code generator, the CDMA code selector providing an orthogonal spreading code output of a combination of the isolation code generator output and a selected CDMA spreading code; and means for processing the QPSK data signals utilizing the in-phase data bits and the quadrature data bits to produce a modulated signal comprising a plurality of chips wherein each alternate chip corresponds to a modulator transition mapped to an angular offset preventing transitions through a modular state origin.

20. The apparatus according to claim 19 further comprising:

means for performing a sinusoidal interpolation on the modulator transitions to map the transitions to the unit circle.

21. The apparatus according to claim 19 further comprising:

a direct digital frequency synthesizer connected to the means for processing, the synthesizer performing rotations on modulator transitions of processed QPSK data signals on a unit circle.

22. The apparatus according to claim 19 further comprising:

a solid state power amplifier.

23. The apparatus according to claim 19 further comprising:

timing means connected to both an in-phase data bit rail and a quadrature data bit rail for controlling timing.

24. The apparatus according to claim 19 wherein the CDMA code selector generates a CDMA spreading code.

25. The apparatus according to claim 19 further comprising a modulo-2 adder.

26. The apparatus according to claim 19 further comprising logic means for controlling direction and distance of the mapping of transitions on a unit circle.

27. The apparatus according to claim 19 further comprising:

means for filtering the modulated signal.

28. The apparatus according to claim 19 further comprising:

a traveling wave tube amplifier.

29. The method according to claim 1, wherein the step of mapping comprises the step of mapping modulator transitions of alternating chips to QPSK constellation states in accordance with an angular offset of approximately 90 degrees.

30. The modulator of claim 19, wherein the means for processing comprises means for processing the QPSK data signals utilizing the combination to produce a modulated signal comprising a plurality of chips wherein each alternate chip corresponds to a modulator transition mapped to an approximately 90 degree offset.

\* \* \* \* \*